(12) United States Patent
Matsueda (10) Patent No.: US 7,242,488 B2
(45) Date of Patent: Jul. 10, 2007

(54) METHOD AND APPARATUS FOR PRINT JOB CANCELLATION WITHIN A DISTRIBUTED PRINTING SYSTEM

(75) Inventor: Kazutaka Matsueda, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 882 days.

(21) Appl. No.: 10/159,032

(22) Filed: Jun. 3, 2002

(65) Prior Publication Data

US 2002/0186400 A1     Dec. 12, 2002

(30) Foreign Application Priority Data

Jun. 6, 2001     (JP) .............................. 2001-171380

(51) Int. Cl.
*G06K 15/00*     (2006.01)
*G06F 3/12*     (2006.01)
(52) U.S. Cl. ..................................... 358/1.14; 358/1.15

(58) Field of Classification Search ......... 358/1.1–1.18
See application file for complete search history.

(56) References Cited

U.S. PATENT DOCUMENTS 6,266,693 B1 *     7/2001     Onaga ........................ 709/219

* cited by examiner

*Primary Examiner*—Douglas Q. Tran
(74) *Attorney, Agent, or Firm*—Fitzpatrick, Cella, Harper & Scinto (57) ABSTRACT

A server printing system registers the status of a print job issued to the printer in a management table of the printer. When there is a request from an application to cancel the print job, and the job to be cancelled is not registered in the job queue, the job is set to be deleted later from the server printing system management table. When the server printing system receives notification of a job generation event from the printer, the server printing system ascertains whether or not the job included in the event is set to be cancelled and, if so, cancels the print job.

19 Claims, 9 Drawing Sheets

| SYSTEM ID | JOB HANDLE | STATUS |
|---|---|---|
| 0x00000001 | 0xc9000001 | DELETE COMPLETED |
| 0x00000002 | 0xc9000002 | ENTRY COMPLETED |
| .. | .. | .. |
| 0x00000010 | 0xc9000010 | BEING DELETED |
| 0x00000011 | 0x00000000 | BEING ENTERED |
| .. | .. | .. |
| 0x00000020 | 0x00000000 | TO BE DELETED |
| 0x00000021 | 0x00000000 | UNENTERED |

METHOD AND APPARATUS FOR PRINT JOB CANCELLATION WITHIN A DISTRIBUTED PRINTING SYSTEM

FIELD OF THE INVENTION

The present invention relates to a printing system and print control apparatus and method adapted to sending a print job (hereinafter sometimes also referred to as simply a "job") to a printer, acquiring the status of the print job from the printer, and canceling a print job already inside the printer.

BACKGROUND OF THE INVENTION

A network printer connected directly to a LAN or other network is equipped with a function that follows the recommendations of the document printing architecture, or DPA. For this type of printer, it is possible to cancel a print job already inside the printer, to list information about a job, to change the output priority of the job, and so forth, all from a terminal on the network. Additionally, printing systems that make it possible to control a network printer are now commercially available. Such printing systems provide functions that are called from a user application, as a result of which the printer can be used more easily.

Ordinarily, a network printer is provided with a LAN interface card called a network interface card, or NIC, through which output images are sent to a controller inside the printer. If an instruction is issued from a user application to cancel a print job after the job has been sent to the printer from the user application via the printing system, the printing system executes a cancellation of the job using a predetermined procedure.

In addition to handing over the print job issued from the application to the printer, the printing system also tracks which print jobs are currently being processed by the printer and which jobs are in the queue for printing. In addition to the cancellation described above, the printing system can also perform a variety of control operations, such as upon request outputting the printer status to the application and changing the order in which the print jobs are processed.

However, current printing systems described above have several disadvantages, as described below.

For example, even when a print job is entered into the printer from the application program via the printing system, it can happen that the particular job in question is not stored in the job management area inside the printer because the upper limit on the number of jobs that the printer can hold at one time has been exceeded. Jobs that are not stored in the printer's management area cannot be seen from the printing system, either, and as a result, such a print job cannot be cancelled.

In such a case, the printing system must respond promptly to a job cancel request from the upstream application, because unless the printing system does respond to such a request the system may shut down in the interim. As a result, the printing system fails to cancel the designated print job and answers the application with an error code indicating that the job cancel has failed. Or, the printing system executes a soft reset of the printer—while running the risk of deleting other print jobs as well—and answers the application with a cancel succeed return code. In either case, the cancellation is not only not certain, but, depending on the method employed, there is a possibility that jobs other than the designated one will be canceled instead.

SUMMARY OF THE INVENTION

Accordingly, the present invention has been proposed to solve the above-described problems of the conventional art, and has as its object to provide a printing system and print control apparatus and method capable of reliably canceling a print job upon request even when the job to be cancelled is not in the printer due to an overflow.

The above-described object is achieved by a print control apparatus having an acquisition unit and a deletion control unit. The acquisition unit acquires print job status information indicating that a print job input from a printer can be deleted. The deletion control unit uses the print job status information to determine whether or not the print job designated for cancellation can be deleted and cancels the print job designated for cancellation once it is determined that the print job can be deleted.

Preferably, the print control apparatus further includes a storage unit for storing print job information including print job status issued to the printer. In response to a print job cancellation instruction, the deletion control unit determines the status of the print job for which a print job cancellation instruction has been issued based on the print job information stored in the storage unit and sets the print job status to later delete if the print job status is such that the print job cannot be deleted at once. In response to an information acquisition instruction, the acquisition unit determines whether or not the status of the print job to be deleted later is such that the print job can be deleted at once, and if so, deletes the print job.

Preferably, the acquisition unit acquires the notification from the printer indicating whether or not an input print job can be deleted through a job generation event issued by the printer that indicates that the input print job is registered in a job queue.

Preferably, the acquisition unit acquires the notification from a printer indicating whether or not an input print job can be deleted through a response to a command issues to the printer to acquire a list of print jobs registered in a job queue.

Preferably, the printer is connected via a communications network.

Additionally, the above-described object is achieved by a printing system having the above-described print control apparatus, a print unit that issues print jobs to a printer, and a client apparatus having a server communications unit that issues a cancellation request for the print job to the print control apparatus.

Other objects, features and advantages of the present invention besides those discussed above shall be apparent to those skilled in the art from the description of a preferred embodiment of the invention which follows. In the description, reference is made to accompanying drawings, which form a part thereof, and which illustrate an example of the invention. Such example, however, is not exhaustive of the various embodiments of the invention, and therefore reference is made to the claims that follow the description for determining the scope of the invention.

BRIEF DESCRIPTION OF THE DRAWINGS

FIG. 6 is a flow chart of operations performed when a print request is generated to the client printing system from an application or the like;

DETAILED DESCRIPTION OF THE PREFERRED EMBODIMENTS

Preferred embodiments of the present invention will now be described in detail in accordance with the accompanying drawings.

In order to facilitate an understanding of the present invention, a description will first be given of a printing system and its operation.

Figure 1:
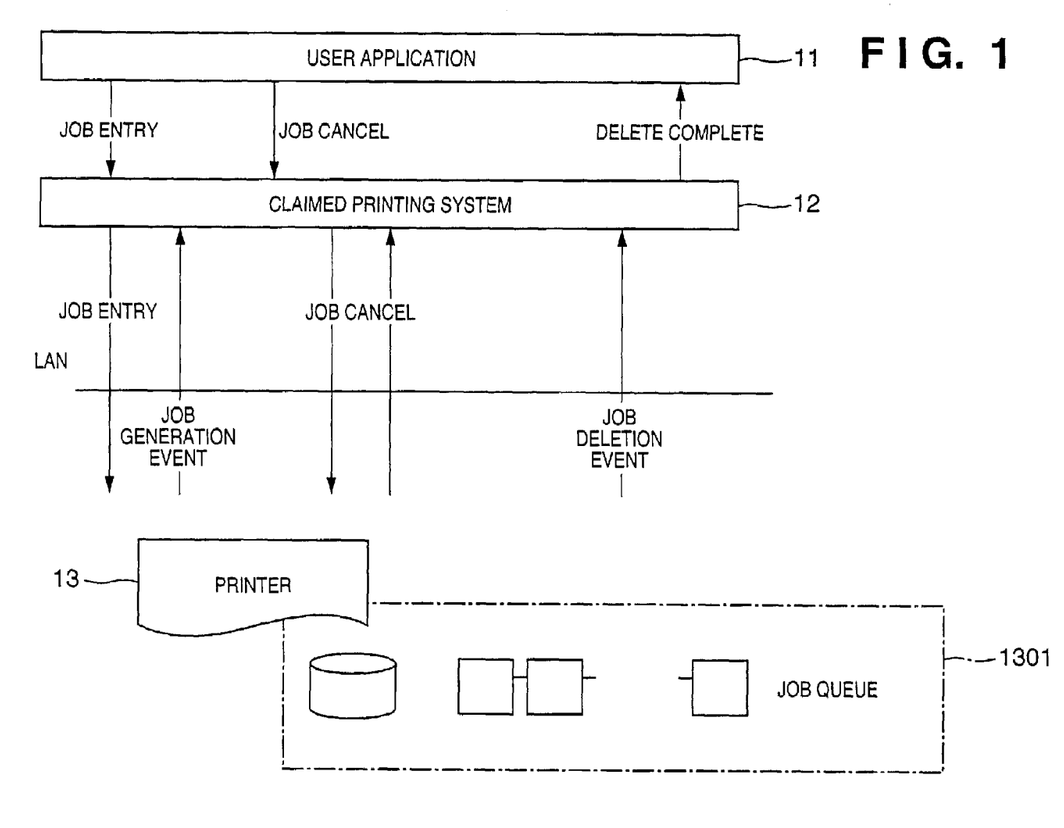
FIG. 1 is a block diagram of a system.

FIG. 1 is a block diagram of a printing system according to the present invention, showing the software configuration of the network system including the printing system. According to FIG. 1, a user application 11 and a printing system 12 executed by a host computer and a network printer 13 connected via a LAN. In the computer, the user application program 11 that attempts to carry out printing inserts a job which is a print request into the printing system 12 and waits for completion of the exit of paper from the printer 13. Notifications, commands and responses, such as notification of the insertion of the job event and the occurrence of the paper exit event and the command to list jobs awaiting printing, are exchanged between the printing system 12 and the network printer 13 via the LAN. It should be noted that, in the present specification, messages indicating occurrence of an event are called simply "events".

A job queue 1301 is provided inside the network printer 13, in which received jobs are registered in order of processing. When the network printer 13 receives a job insert command from the printing system 12, that job is added to the internal job queue. After being added to the job queue 1301, notification of a job generation event is sent to the printing system 12, and the jobs are processed in order from the top of the job queue 1301 and printed out. When the process of printing one job is completed and the paper exit is completed, the network printer 13 notifies the printing system 12 of a paper exit completion event. It should be noted that the job generation event can also be information indicating that the job the printer has received can be deleted.

When the network printer 13 receives a command from the printing system 12 to list jobs, the network printer 13 transfers job information about each job registered in the job queue 1301 to the printing system 12. When the printing system 12 receives a response to a job generation event, job deletion event or job list command from the network printer 13, the printing system 12 changes the status on its management table depending on the content of the response. For example, when it is confirmed that a job has been generated via notification of a job generation event from the job queue 1301, job information for the generated job is registered in the management table. Similarly, when it is confirmed that a job has been deleted via notification of a job deletion event from the job queue 1301, job information for the generated job is removed from the management table.

A description will now be given of the configuration of the printing system.

Figure 2:
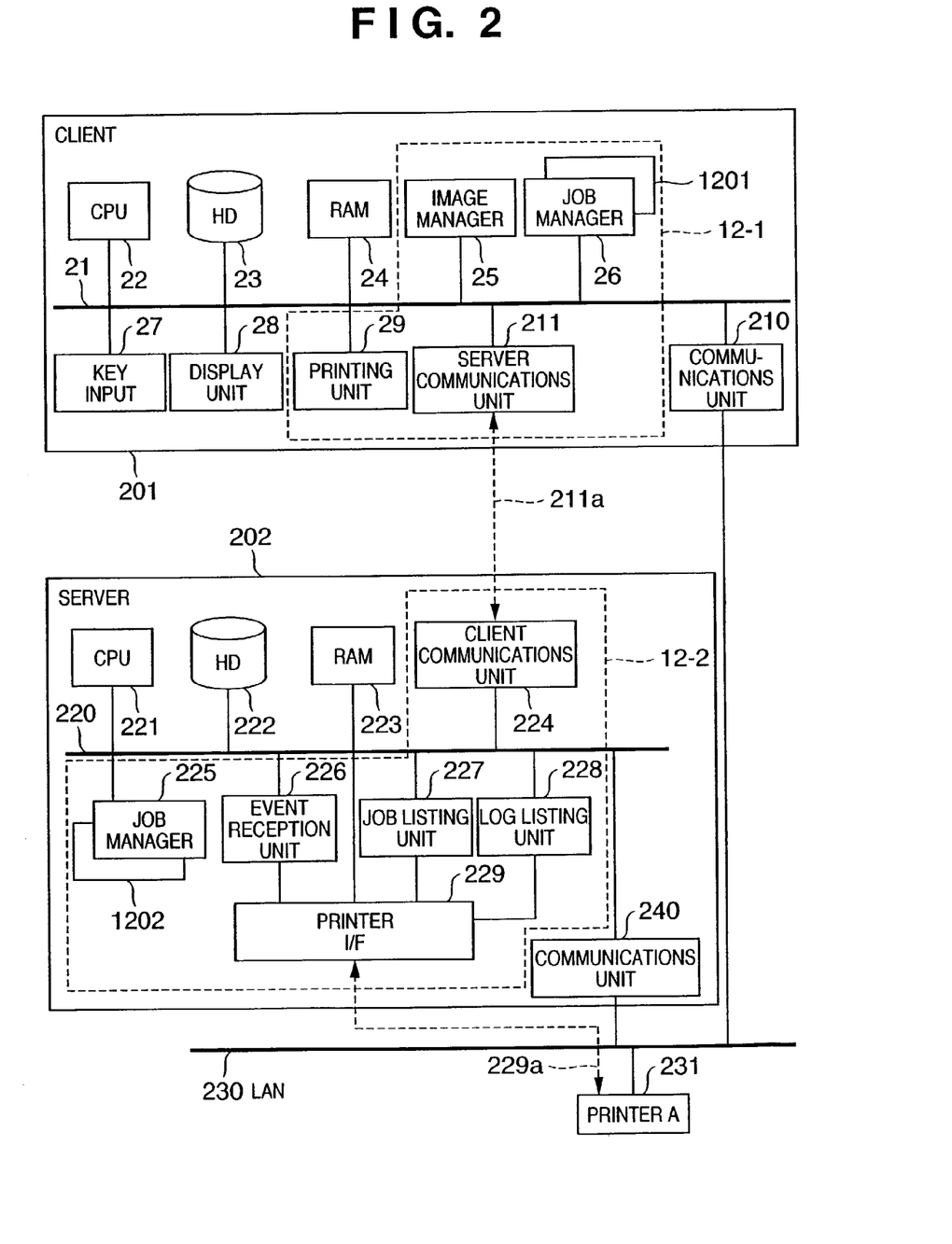
FIG. 2 is a block diagram of the printing system of the present invention.

FIG. 2 is a block diagram of the printing system of the present invention. In the present embodiment, a client 201, server 202 and a network printer 231 are connected via a LAN 230.

The client 201 is configured so that a CPU 22 and other devices are connected to a system bus 21. The CPU 22 executes a program loaded in the RAM 24, and exerts overall control of the system. The control codes and data for the executed program are written as files to a hard disk 23, and loaded into the RAM 24 as necessary. A key input unit 27 includes a keyboard and a pointing device. A display unit 28 includes an image display apparatus and an LED indicator, and is used to exchange information with an operator. A communications unit 210 controls Winsock communications.

At the client 201, using the above-described hardware resources, the execution of a predetermined program or programs by the CPU 22 forms a client printing system 12-1 that includes a job manager 26, a printing unit 29 and a server communications unit 211. The functions of these blocks can also be carried out by dedicated hardware.

An image manager 25 manages a job issued by the application program. The job management program 26 is an area for the management of print job information issued to the printer 231 from the client 201, and includes a job management table 1201 to be described later. Physically, it is provided on the hard disk 23 and the RAM 24. The printing unit 29 controls the print protocol for the printer 231. In other words, the printing unit 29 controls the order and type of commands. The server communications unit 211 controls communications with the server, handles RPC (remote procedure calls) and executes communications 211a with the server 202. The communication 211a shown in the drawing show a logical conjunction; physically, communications are conducted via a communications line.

When a job is entered by the client 201 user application or by an external personal computer application, an image is stored by the image manager 25 and job information is stored in the FIFO queue that the job manager 26 manages. Then, the job information is stored in the job manager 26 queue.

The server 202 is configured so that a CPU 221 and other devices are connected to a system bus 220. The CPU 221 executes a program loaded into the RAM 223, and exerts overall control of the system. The control codes and data of the executed program are written as files to a hard disk 221, and loaded into a RAM 221 as necessary.

At the server 202, using the above-described hardware resources, the execution of a predetermined program or programs by the CPU 221 forms a server printing system 12-2 that includes a client communications unit 224, a job manager 225, an event reception unit 226, a job listing unit 227 and a log listing unit 228. The functions of these blocks can also be carried out by dedicated hardware.

The client communications unit 224 controls communications 211a with the client 201.

The job manager 225 records in a management table 1202 the current status of a job entered into the printer 231 by a client connected to the LAN 230. The event reception unit 226 receives event information from the printer 231. The job listing unit 227 acquires job information queuing in the printer 231 and creates a list of such jobs. The log listing unit 228 acquires from the printer 231 and checks a print result log held in the printer 231.

It should be noted that the job manager 225, the event reception unit 226, the job listing unit 227 and the log listing unit 228 are formed by the execution of predetermined programs by the CPU 221.

A printer interface 229 sets and analyzes the data mutually exchanged according to the communications procedure and data type determined by the protocol established between the printer and the client. The logical connection to the printer 231 is effected by the printer interface 229.

It should be noted that the server 202 is shown in the diagram with an emphasis on just its function as a server. However, those of ordinary skill in the art can appreciate that the server can also have the ability to function as a client. In such a case, the server 202 is also equipped with a client printing system 12-1 as well as a key input unit and a display unit.

Hereinafter, the client printing system 12-1 and the server printing system 12-2 are together called the printing system 12.

A description will now be given of the operation of the printing system 12 according to the present invention, with reference in the first instance to FIGS. 1 and 2.

The client printing system 12-1, having received a print request from a user application, holds both image and job information in each of the image manager 25 and the job manager 26. When it is time to commence printing, the client printing system 12-1 first transmits a signal via the server communications unit 211 to the server 202 to begin to print.

Upon receiving a request from the client 201 to commence printing, the server printing system 12-2 that manages the printer 231 transmits, via the client communications unit 224, a print commencement response as soon as the printer 231 becomes empty and is capable of receiving a new job. At such a time, the server printing system 12-2 allocates a special system ID for each received print commencement request, and transmits the system ID value to the client 201 together with the print commencement response.

Having received a print commencement response, the client printing system 12-1 adds the received system ID to the job that corresponds to the print commencement request. The client printing system 12-1 then transmits that job to the printer 231 via the printing unit 29 and the communications unit 210 according to a predetermined print protocol. At the same time, the client printing system 12-1 supplies the server 202 with both a notification that a job has been entered as well as the system ID. At the server 202, a job status to be described later is then revised according to the above-described notification. By so doing, the server printing system 12-2 receives only the print commencement request and not the print job itself (the job itself being the collection of commands and data that make up the job). As a result, the communication load on the network generated as the job is forwarded from the client 201 to the server 202 can be deleted.

Upon receipt of a job, the printer 231 queues the job in a print wait queue and begins printing in a FIFO (First In First out) sequence. The printer 231 then issues a job generation event to the server 202 (that is, the server printing system 12-2). An ID called a job handle that the printer allocates to the job upon a job generation event is then added to the job. The job handle is stored so as to be distinguishable by job registered in the queue.

The server printing system 12-2 uses the job handle received from the printer 231 to request of the printer 231 the system ID that corresponds to the job handle. In response to such a request, the printer 231 supplies the system ID corresponding to the received job handle.

The job listing unit 227 then requests print wait queue information of the printer 231. In response to such a job listing request, all information pertaining to jobs held in the queue (that is, a job list) is supplied to the server.

The log listing unit 228 requests print result queue information of the printer 231. The printer 231 then supplies the server printing system 12-2 with only such information as is requested.

The printer 231, once it has executed the job and exited the paper on which the image is formed, notifies the server printing system 12-2 of a job completion event, at which time the job handle that the printer allocated to the job is also supplied to the server printing system 12-2 from the printer 231.

When the event reception unit 226 receives notification of a job generation event, a job completion event or a job deletion event, or when the event reception unit 226 acquires printer queue information by request from the job listing unit 227, the job manager 225 changes the status of the managed job depending on the received event or queue information. For jobs for which the status has been changed, the server printing system 12-2 issues a notification of change of job status to the client printing system 12-1 that is actually managing the job via the client communication unit 224. The client printing system 12-1, having received such notification via the server communications unit 211, revises the management table 1201 according to the received job status change.

Similarly, when there is a job cancellation request from the user application, the client printing system 12-1 transmits that job cancellation request to the server printing system 12-2 via the server communications unit 211 and the client communication unit 224. The server printing system 12-2 then executes a cancellation according to the status of the job managed by the job manager 225, a detailed explanation of which will be given later.

A description will now be given of the structure of the printer, with reference to FIG. 3.

Figure 3:
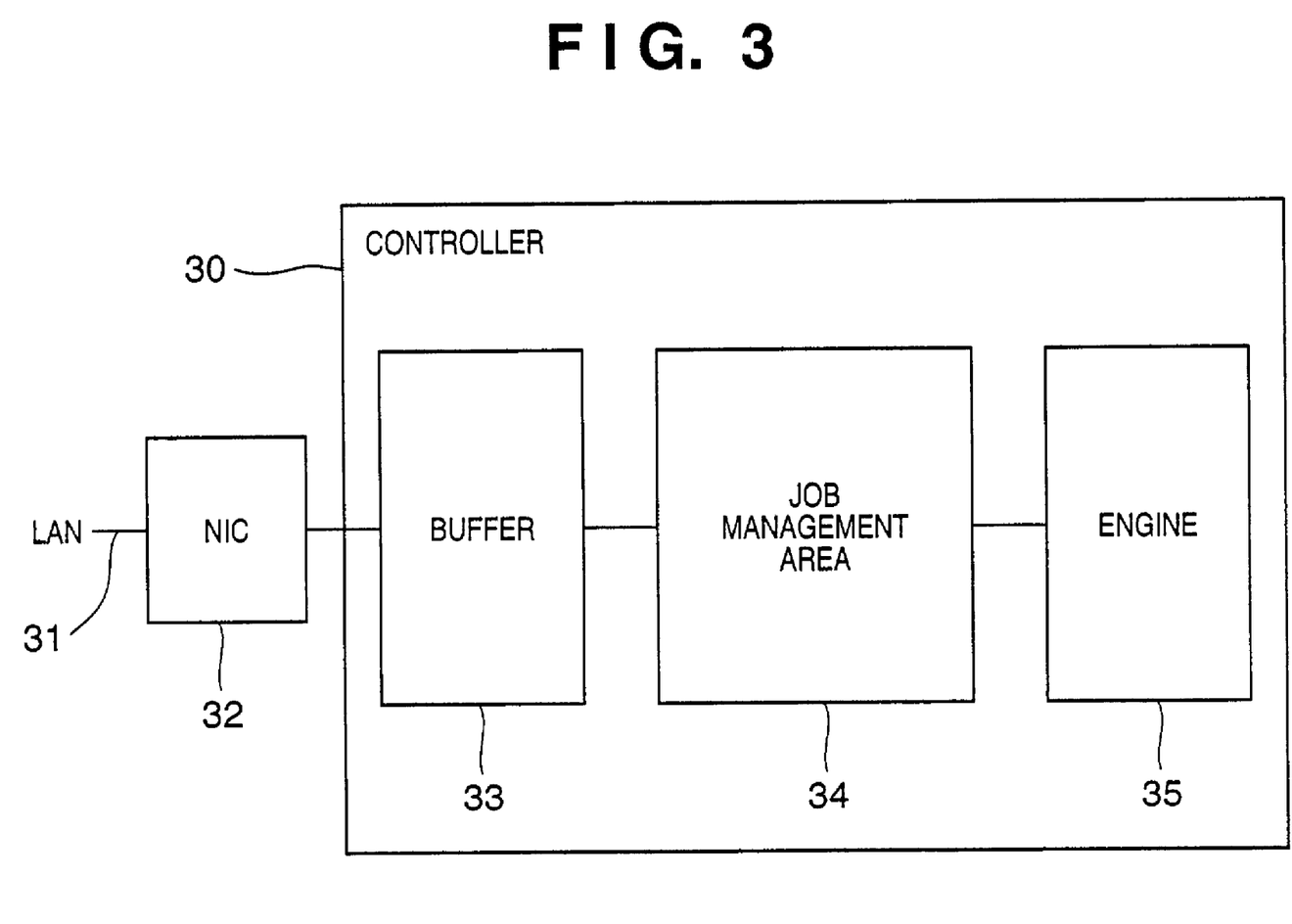
FIG. 3 is a block diagram of an interior of a printer.

FIG. 3 is a block diagram of an interior of a printer. The block diagram shown in FIG. 3 depicts the route taken by a job up to the point at which it is output by the engine.

A LAN 31 is at the entrance to the network printer. NIC 32 is the interface between the network printer and the LAN 31. In the typical network printer, data flows to a controller via the NIC. The controller 30 includes a buffer memory 33, a job management area 34 and an engine 35. The buffer memory 33 is a region in which a job is temporarily stored before being registered to the job management area 34 or when the job management area 34 is full. A specified number of jobs are stored and managed in the job management area 34, in effect forming a so-called job queue. The specified number of jobs differs depending on the printer, whether 32 or 64. Jobs that exceed the specified number are not managed in the job management area 34 but are instead left in the buffer 33 or the NIC 32. Additionally, when the buffer 33, too, is full, the NIC 32 becomes unable to accept data via the LAN. The engine 35 is the printer-internal engine, and performs translation, bit map development and print processing.

Figure 4:
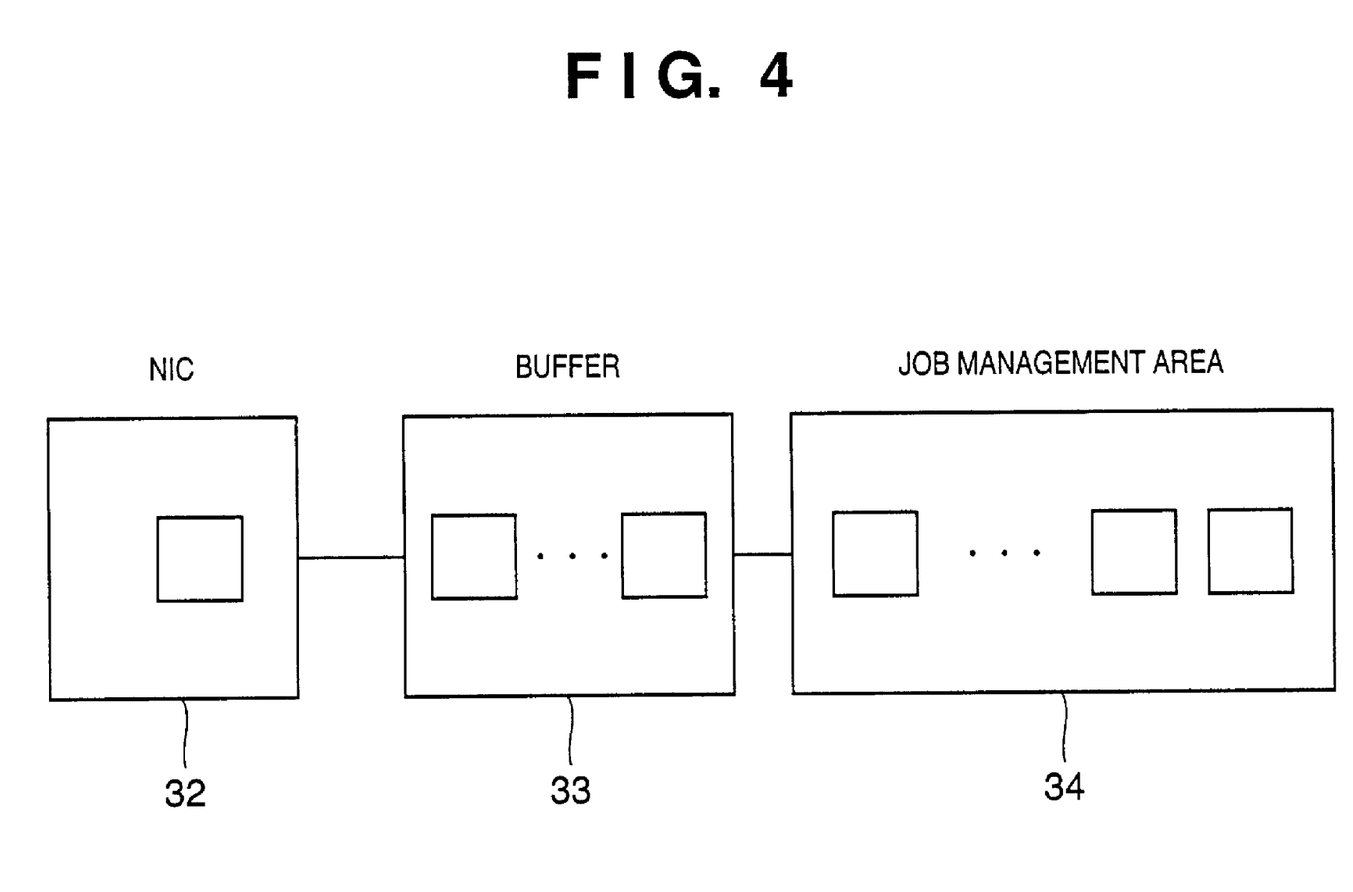
FIG. 4 is a block diagram of job management inside a printer.

FIG. 4 is a block diagram of job management inside a printer. In the job management area 34 are jobs of a specified number. Both system ID and job handle are included in the managed job information. Jobs that cannot be entered in the job management area 34 are managed in the buffer 33, and there is a possibility that jobs that cannot enter the buffer 33 are resident in the NIC 32.

It is possible that jobs will back up into the buffer 33 when the job management area 34 is full as well. Moreover, it is also possible that jobs will remain in the buffer 33 and NIC 32 depending on the state of the printer, for example, if trouble occurs at the printer. The printer as well as the personal computer connected via the LAN and the printing system formed thereby can only see those jobs that are in the job management area 34, and can neither see nor delete those jobs that are backed up in the buffer 33 and NIC 32. Such jobs cannot be seen because a job handle is generated and a job generation event arises only after the job is registered in the job management area 34. The server printing system 12-2 detects the existence of a job in the printer only after it is notified of a job generation event, and therefore cannot manage a job for which no job generation event occurs.

Figure 5:
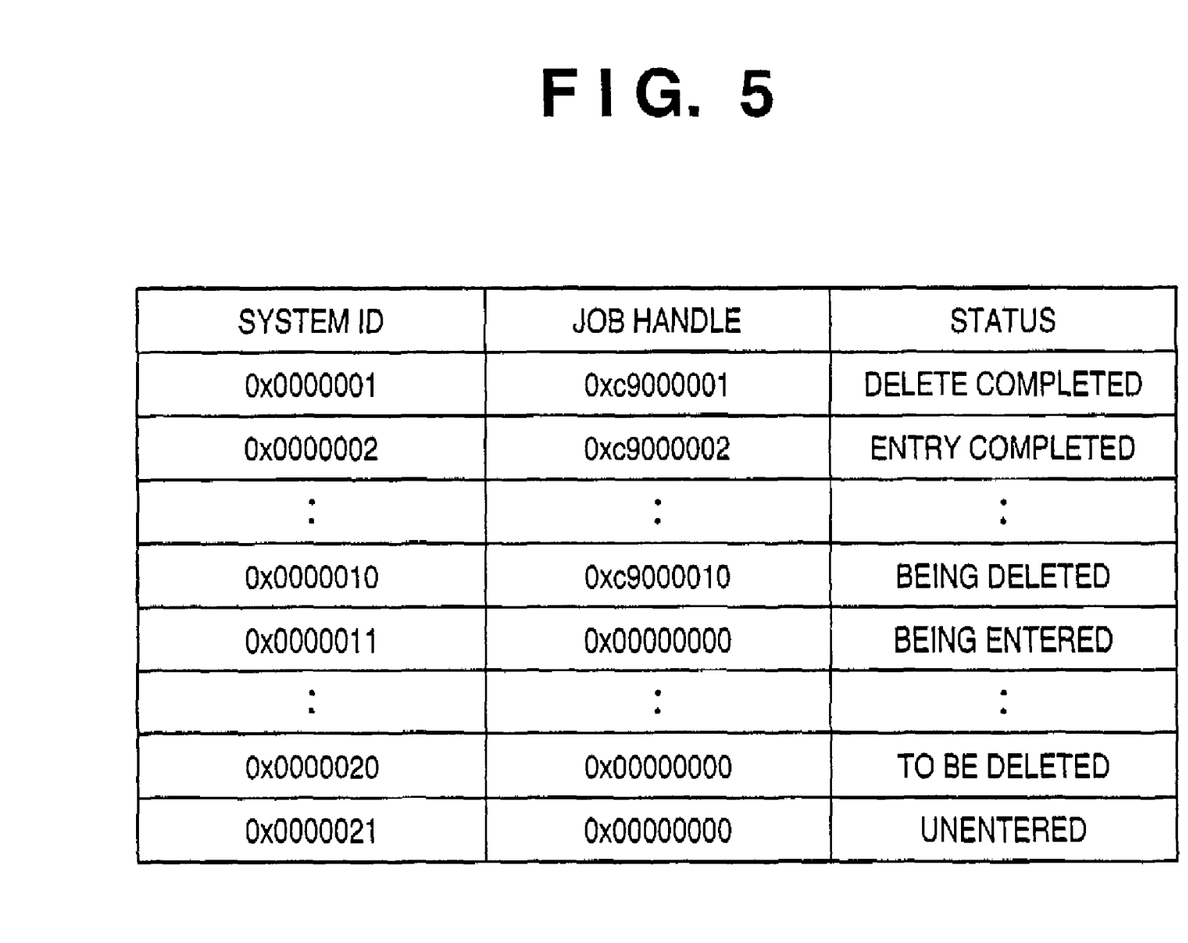
FIG. 5 is a diagram showing a sample job management table used in the present printing system.

FIG. 5 is a diagram showing a sample job management table used in the present printing system. "Printing system" means the client printing system 12-1 and the server printing system 12-2 described above.

Job management tables 1201, 1202 are management tables shown existing in the job managers 26 and 225, and manage system ID, job handle and status together.

The system ID is an ID specific to the job that the server printing system 12-2 generates in response to a print request from a client. The job handle is generated by the printer 23 when the job is stored in the job management area 34. The printer 231 can notify the server printing system 12-2 of the job handle by notification of a job generation event or by responding to a list request. The status is changed by the printing systems 12-1, 12-2 and is the information that forms the cornerstone of the job management method according to the present invention. In FIG. 5, the job with the system ID 0x0000001 is given the job handle 0xc9000001 and its status is "deleted". Jobs that have been deleted are beyond control, and such a job is literally in the process of disappearing from the tables 1201, 1202.

The next job 0x0000002 is one for which either the job is entered in the printer 231 and the server 202 receives notice of a job generation event from the printer 231 or the status is obtained via a job list request conducted periodically. This particular job has already been given a job handle, so we know that such job is stored in the job management area 34.

The status of the next job 0x0000010 is "being deleted", indicating that the printing system 12 has issued a job cancellation command and the job is in the process of being deleted.

Job 0x0000011 is shown in the process of being entered in the printer 231. Such a status indicates that either the job is in the process of being entered according to a LPR or other print protocol or that the transmission of the job to the printer is completed but that the job has not yet reached the job management area 34. Since such a job has not been stored in the job management area 34, no job handle has been generated. Therefore no job generation event has occurred, either, and thus the value for that column remains at the default value, which is 0x00000000.

Job 0x0000020 is also a job that has not yet reached the job management area 34, and accordingly the job handle remains at the default value. Moreover, the status of this job is "to be deleted", indicating that a cancellation request has been received from the printing system 12. A job with this status will be cancelled as soon as it reaches the job management area 34.

Job 0x0000021 has not yet been entered in the printer and the LPR print protocol has not been executed, so the job remains under the management of the image manager 25.

In the present embodiment, as described above the job information is managed by the job management tables 1201, 1202, with the job status set at "to be deleted". Setting the job status at "to be deleted" shows that a job is stored in the job management area 34, after which such job can be deleted. As a result, the job can be reliably deleted. If the job is not given the status "to be deleted", a request to cancel a job that has not reached the job management area 34 cannot be recorded, with the result that the job will be executed and the image printed.

A description will now be given of a print request, with reference to FIG. 6.

Figure 6:
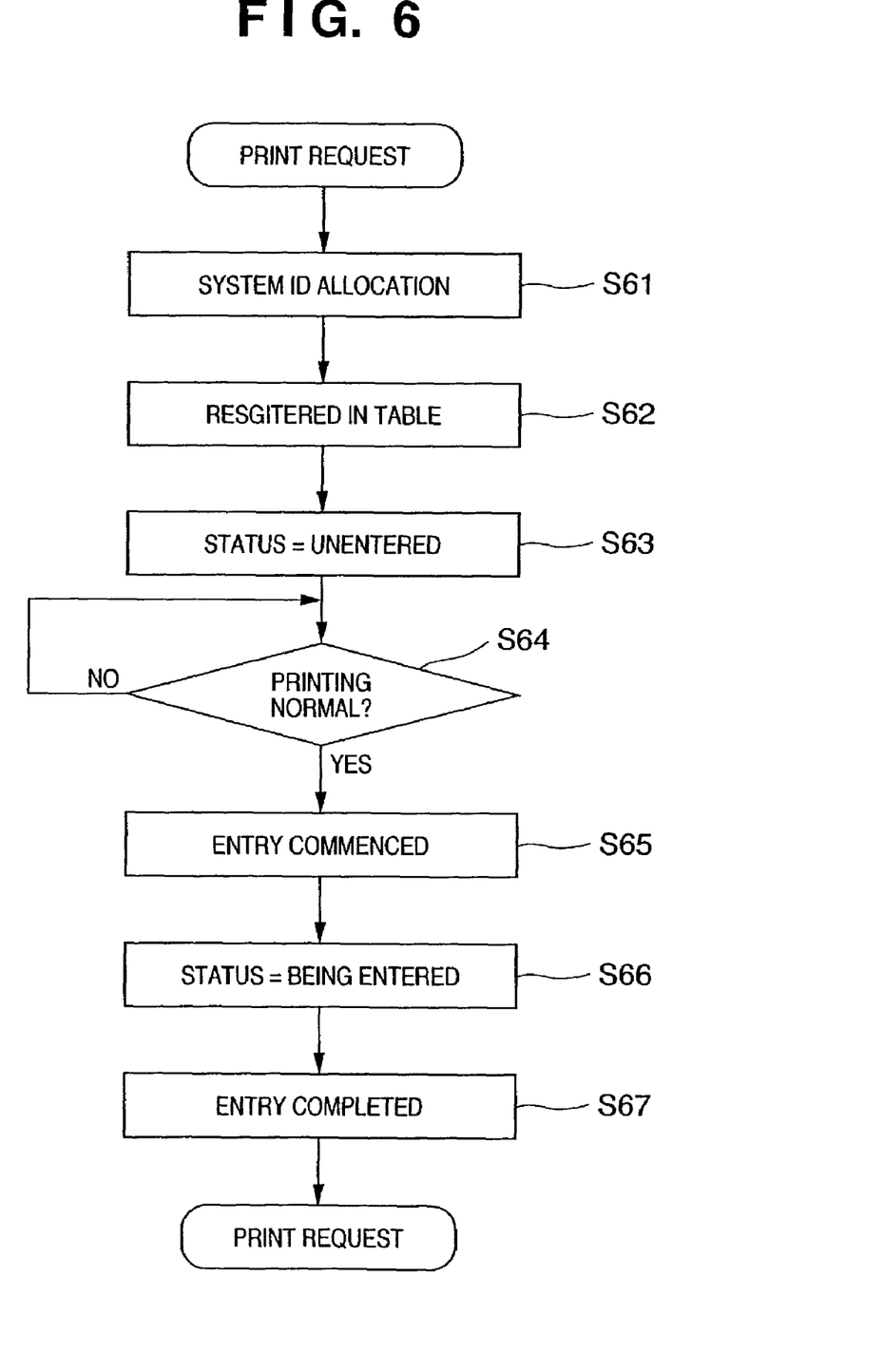

FIG. 6 is a flow chart of operations performed when a print request is generated to the client printing system from an application or the like.

Step S61 is a system ID allocation step. When a print request is sent to the client 201, the client printing system 12-1 issues a print commencement request to the server printing system 12-2 that manages the entire printing process. The server printing system 12-2 then allocates an identifier unique to the system to the print commencement request, the identifier being the system ID. The server printing system 12-2 then transmits the system ID to the client printing system 12-1. The server printing system 12-2 registers the system ID allocated to the print commencement request to the job management table 1202. At this time, the status is "unentered" and the job handle is "0", which corresponds to steps S62, S63 in FIG. 6.

Upon receiving the allocated system ID from the server, the client printing system 12-1 registers the system ID in the job management table 1202 in step S62. The job handle is set to the default value, "0".

In step S63, "unentered" is set for the status of the job registered in the job management table 1201 in step S62.

In step S64, the process awaits a print sequence command from the server 202. When the designated job turn comes up, the process proceeds to a step S65 and commences entering the job, according to the LPR or other print protocol. The allocated system ID is included in the entered job information. It should be noted that at this time the server 202 is also notified that the job has been entered, at which point the server revises the status of the job from "unentered" to "being entered".

In a step S66, the client 201 also revises the status in the printer-entered job management table 1201 to "being entered". The print procedure is completed in a step S67.

According to the above-described procedure, the client 201 allocates a system ID to the job, enters the job in the printer 231 and revises the contents of the job management table. The server 202 also revises the contents of the job management table 1202 to match the job management table 1201 having the client 201.

A description will now be given of a job cancellation request process.

Next, a description is given of a processing procedure by a server printing system for a job cancellation request received from the client printing system.

As described above, when a job cancellation request is issued from an application or the like, the client printing system 12-1 issues a job cancellation request to the server printing system 12-2.

Figure 8:
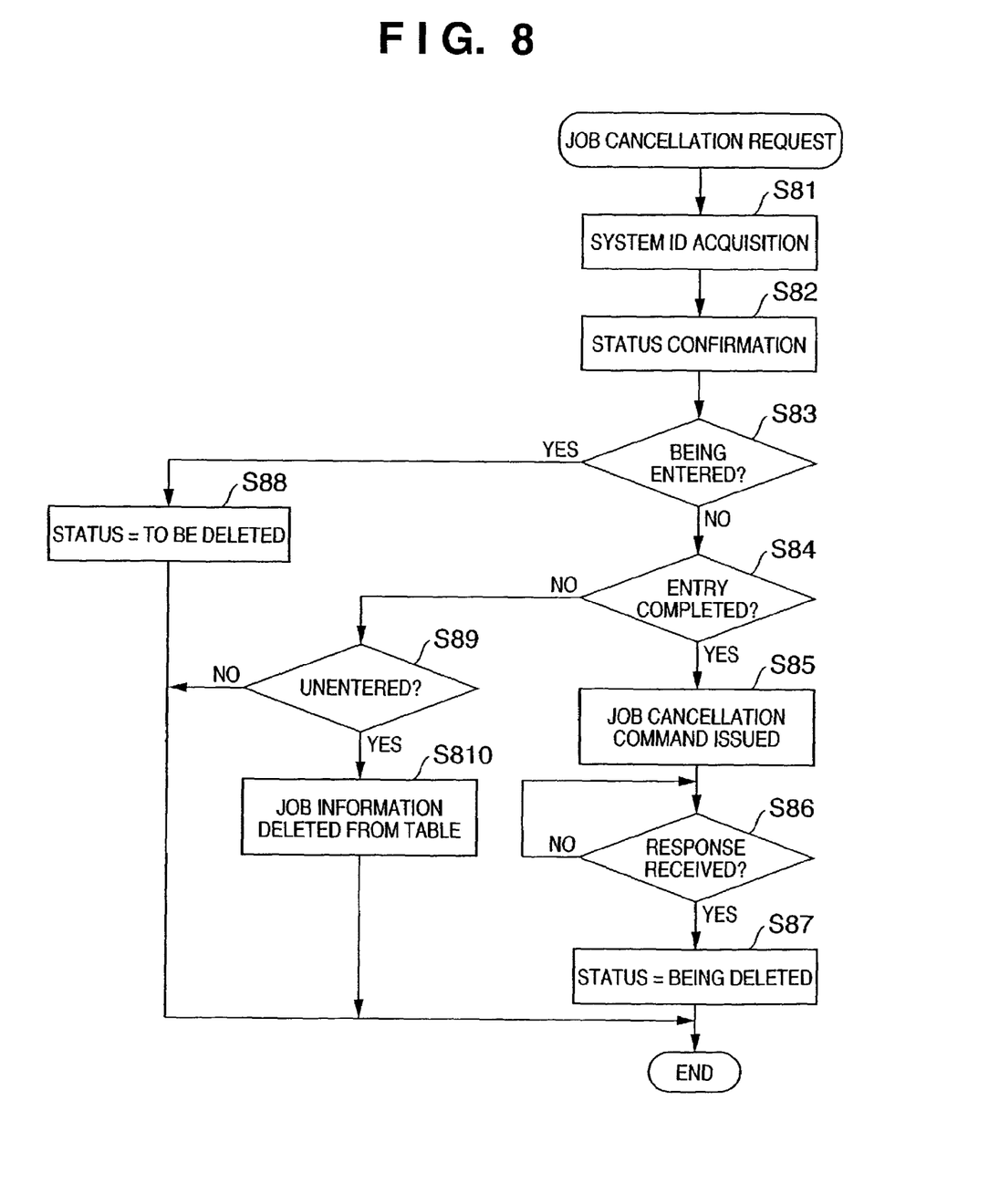
FIG. 8 is a flow chart of operations performed when a job cancellation request is generated from an upstream application to the present printing system.

FIG. 8 is a flow chart of operations performed when a job cancellation request is generated from an upstream application to the present printing system;

As shown in the diagram, in a step S81, the system ID for the job for which a job cancellation request has been issued is acquired. The system ID is included in the job cancellation request and the same ID is registered in the job management table 1202. In a step S82, the status of the job in the job management table 1202 is checked. In a step S83, it is determined whether or not the status is "being entered". If the status is not that of "being entered", then the process proceeds to a step S84, where it is ascertained whether or not the status is that of "already entered". If the job status is "already entered", then the designated job exists in the job management area 34 of the printer 231 and a job cancel command is issued to the printer 231 in a step S85. In a step S86, the cancel command response is received. In a step S87 the status of the job to be cancelled is changed to "being deleted".

If, on the other hand, in step S84 it is determined that the status of the designated job is not that of "already entered", then the process proceeds to a step S89, where it is determined whether or not the status is "unentered". If the status is "unentered", then the job information for the job to be cancelled is deleted from the job management table 1202 and the unentered job is removed from the printing system. If in step S83 it is determined that the job is "being entered", then the process proceeds to a step S88 and the status of the job to be cancelled is set to "to be cancelled". This is because the job is already entered in the printer 231 but is not yet stored in the printer's job management area 34, so a cancel command cannot be issued to the printer 231 and even if such a command could be issued to the printer the job cannot be deleted.

As described above, for each designated job cancellation request, the present invention either deleted the job if the job can be deleted or sets the status of the job to "to be deleted" if the job cannot be deleted. A job to be deleted is deleted as soon as it becomes possible to do so, by the event processing procedure described next, with reference to FIG. 7.

Figure 7:
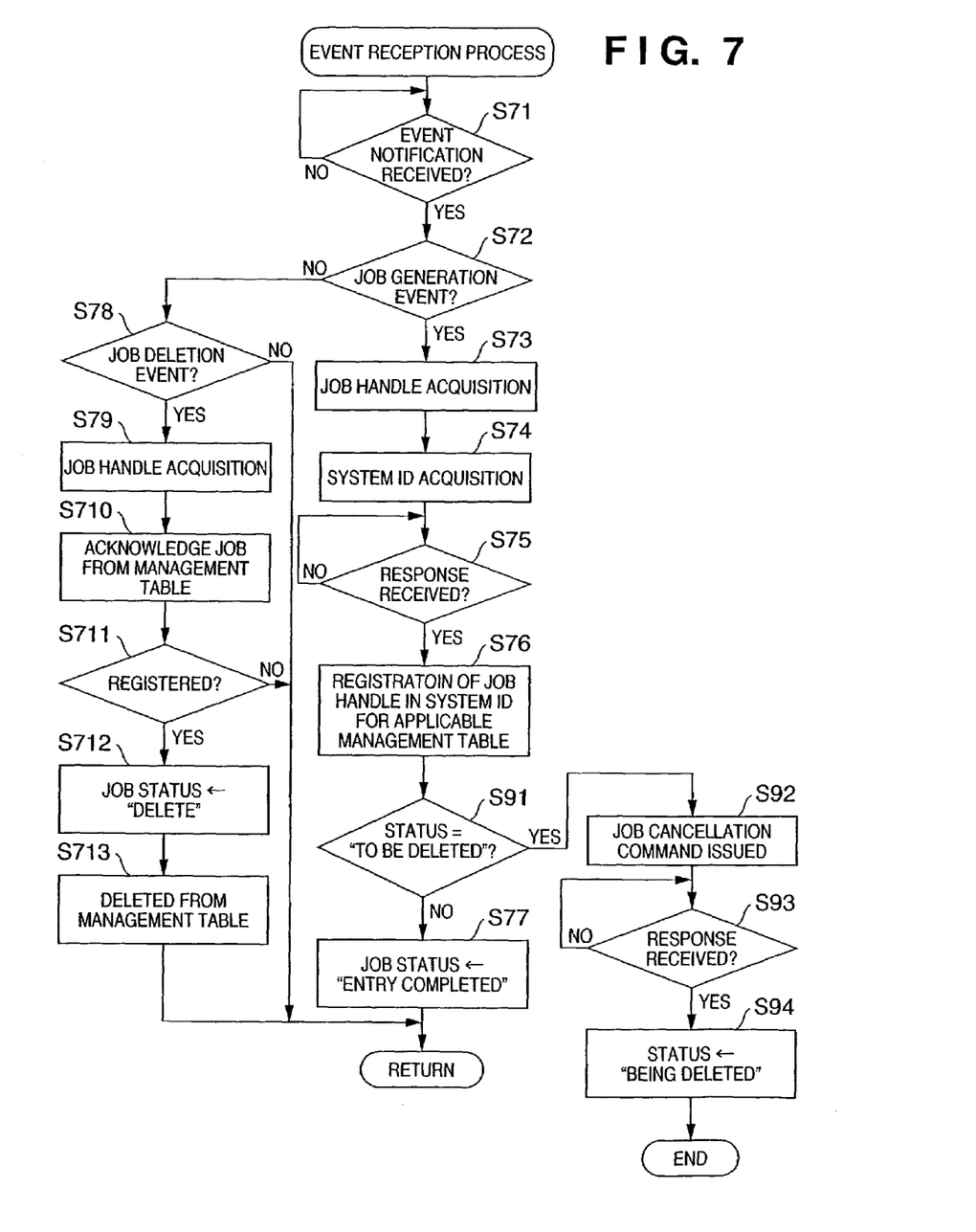
FIG. 7 is a flow chart of operations performed when an event is generated from a printer to the present printing system.

FIG. 7 is a flow chart of operations performed when an event is generated from a printer to the present printing system.

Step S71 is an event notification reception waiting step, such that, when notification of an event is received the process proceeds to a step S72. In step S72, the received event notification it is determined whether or not the received event notification is a job generation event.

If in step S72 it is determined that the received event notification is not a job generation event, then in a step S78 it is determined whether or not the received event notification is a job deletion event, and, if so, the process proceeds to a step S79, where the job handle for the deleted job is acquired from the job deletion event.

The job management table 1202 is searched for the acquired job handle in step S710, and in step S711 it is determined whether or not the deleted job is being managed by the job management table 1202 or not. If it is determined that the job is registered in the job management table 1202, then the process proceeds to a step S712.

In step S712, the status of the job is revised to "deleted". In step S713, the job information is deleted from the job management table 1202.

On the other hand, if the received event notification is for a job generation event, then in step S73 the job handle for the job managed by the printer is acquired from the received job generation event.

Step S74 is a step for acquiring the system ID that corresponds to the job for which a job generation event notification has been received from the printer 231. For this purpose the job handle acquired in step S73 is employed. A predetermined system ID acquisition command is transmitted to the printer 231 together with the job handle, by which the system ID is acquired.

When the printer 231 receives the command issued in step S75, the job management area 34 is searched for the job to which is attached the job handle that was received together with the command. The job handle and the corresponding to system ID are then sent back to the server printing system 12-2.

In step S75, the response corresponding to the command issued in step S74 is received from the printer 231.

In a step S76, the system ID and the received job handle are registered in the job management table 1202 as the job handle of the job having the system ID included ion the response received in step S75.

Next, in a step S91, it is determined whether or not the status of the job for which a job handle was registered in step S75 is "to be deleted". If not, then the status of that job should be "being entered", so in a step S77 the status of the job in the job management table 1202 is set at "already entered".

If as a result of the determination made in step S91 it is found that the status of the job is already "to be deleted", then in a step S92 that job is designated and a job cancel command is issued to the printer 231. In a step S93, reception of the results is awaited.

When a response comes from the printer 231 the process proceeds to a step S94 and the status of the job is set at "being deleted". A job in the process of being deleted is deleted by the procedure of steps S78-S713 by notification of a job deletion event from the printer 231.

As described above, by setting the status of a job that is not yet registered in the job management area 34 of the printer 231 to "to be deleted", cancellation of the job can be executed as soon as the job enters the job management area 34.

A description will now be given of a job listing process according to the present invention, with reference to FIG. 9.

Figure 9:
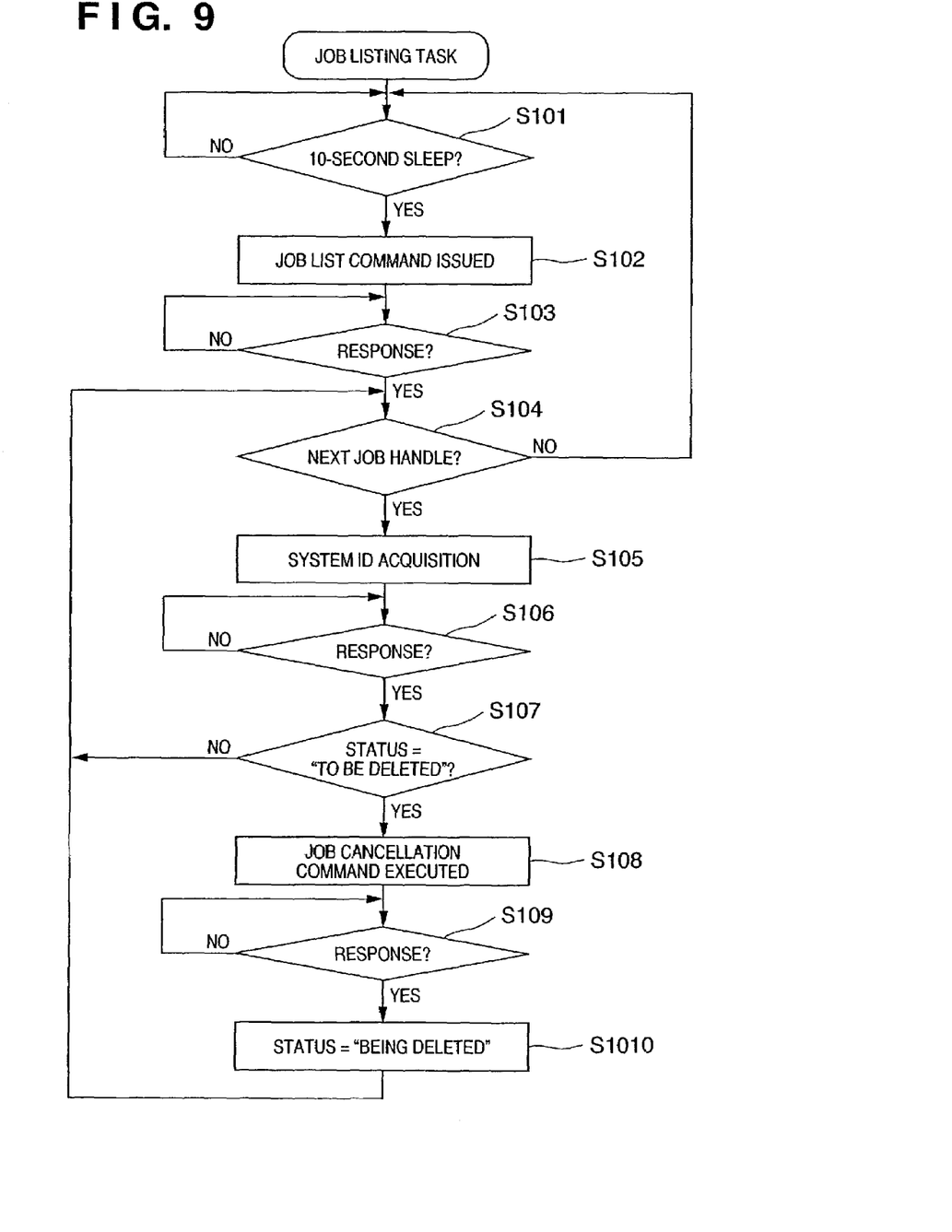
FIG. 9 is a flow chart of operations performed when listing jobs.

FIG. 9 is a flow chart of operations performed when listing jobs.

As shown in the diagram, a step S101 is a sleep step, continuing for an appropriate interval. Such an interval may, for example, be 10 seconds. When the 10-second sleep interval is up, the process proceeds to a step S102 and a job list command is issued to the printer 231. The job list command outputs a list of the print jobs in the print wait queue that are being managed by the printer job management area 34. A step S103 is a step for awaiting the job queue from the printer. Once the jobs waiting to be printed are listed the process proceeds to a step S104. The listing of jobs is performed by the printer supplying the job handles of all the jobs existing in the printer. In step S104, it is determined whether or not there is a job listed. If there are multiple jobs, then each repetition of this step ascertains whether there is a next job.

If a job does exist, then the process proceeds to a step S105, at which time the printer is queried for the system ID that corresponds to the listed job handle. Step S106 awaits that reply from the printer. When the system ID is supplied it is possible to known the status of that job in the management table.

If the status is "to be deleted", then the job is deemed to have been generated by the list request command and the process proceeds to a step S108, at which time a job cancellation command is issued. In a step S109, the reply to the job cancellation command is awaited. In a step S1010, the status of the job in the job management table 1202 is revised to "being deleted". The process then proceeds to step S104, and the routine of steps S105 through to steps S110 is repeated as many times as there are jobs. In other words, by requesting a job list from the printer it is possible to determine that a job has been generated by looking at the job list supplied in response to the request, in the event that, for some reason, a job generation event has not happened. Moreover, it can be determined that the status is "to be deleted" and a cancellation command can be issued to the printer.

Thus, in the event that there is a request from an application or the like to delete a print job as described above, the printing system determines whether or not the job to be deleted is registered in the printer's job management area and thus can be deleted and, if the job is not registered in the job management area and thus is not in a state that allows the job to be deleted, sets the status of such job to "to be deleted". Then, when there is a job generation event and a notification from the printer that the job to be deleted has thereby been registered in the printer's job management area, the printing system issues a job cancellation command to the printer. Or, if the printing system issues a job list command to the printer and in response obtains the job handle of the job to be deleted, and thus ascertains that the job to be deleted is registered in the printer's job management area, the printing system issues a cancellation command to the printer for the job to be deleted.

Thus, as described above, print jobs that conventionally could not be canceled because, though issued to the printer, were not under the printer's management, can by the present invention be reliably cancelled.

It should be noted that although a network printer is used in the embodiment described above, those of ordinary skill in the art can appreciate that a local printer connected by a parallel interface or the like can be employed with equal ease, and that there is no specific limitation imposed on the printer.

Additionally, although the foregoing embodiment has been described with reference to flowcharts illustrating both the job generation event and the job listing, those of ordinary skill in the art can appreciate that the object of the present invention may be achieved using either function. In other words, the distinctive feature of the present invention is that the printing system ascertains that a job generation event has occurred at the printer and, after such job generation, deletes said job. No limitation is placed on the particular method by which the printer ascertains the generation of a job event.

Moreover, those of ordinary skill in the art can appreciate that a buffer is not required for the printer controller, and the absence of a buffer will not affect the internal composition of the printer.

As described above, the present invention makes it possible to promptly and reliably delete a print job by ascertaining the status of the print job in a printer, delaying deletion of the designated job until conditions indicates that the job can be deleted (if the status of the job indicates that the job cannot be deleted immediately) and promptly deleting the designated job when such condition indicate that the job can be deleted.

As many apparently widely different embodiments of the present invention can be made without departing from the spirit and scope thereof, it is to be understood that the invention is not limited to the specific preferred embodiments described above thereof except as defined in the claims.

What is claimed is:

1. A print control apparatus which communicates with a printer, comprising:
   an acquisition unit adapted to acquire print job status information indicating that a print job can be deleted from the printer; and
   a deletion control unit adapted to determine whether or not the print job designated for cancellation can be deleted based on the print job status information and to cancel the print job designated for cancellation when the print job can be deleted based on the print job status information acquired by said acquisition unit,
   wherein said deletion control unit cancels the print job for which said deletion control unit has once determined that the print job could not be canceled when said deletion control unit determines that the print job can be deleted based on current print job status information acquired by said acquisition unit.

2. The print control apparatus according to claim 1, further comprising a storage unit adapted to store print job information including print job status issued to the printer,
   wherein, in response to a print job cancellation instruction, the deletion control unit determines the status of the print job for which a print job cancellation instruction has been issued based on the print job information stored in the storage unit and sets the print job status to a deletion reservation status if the print job status is such that the print job cannot be deleted, and
   wherein, in response to an information acquisition instruction by said acquisition unit, the deletion control unit determines whether or not the print job of which the status is set to the deletion reservation status can be deleted, and if so, deletes the print job.

3. The print control apparatus according to claim 1, wherein the print job status information acquired by the acquisition unit indicates that a print job input by the printer is registered in a job queue.

4. The print control apparatus according to claim 1, wherein the acquisition unit acquires print job status information indicating that the print job can be deleted by issuing a command to acquire a list of registered print jobs to the printer and acquiring the list of registered print jobs.

5. The print control apparatus according to claim 1, wherein the print control apparatus is connected to the printer via a communications network.

6. A printing system comprising:
   the print control apparatus according to claim 1;
   a print unit that issues print jobs to a printer; and
   a client apparatus having a server communications unit that issues a cancellation request for the print job to the print control apparatus.

7. A print control method, comprising:
   an acquisition step of acquiring print job status information indicating that a print job can be deleted from a printer; and
   a deletion control step of determining whether or not the print job designated for cancellation can be deleted based on the print job status information and to cancel the print job designated for cancellation when the print job can be deleted based on the print job status information acquired in said acquisition step,
   wherein said deletion control step cancels the print job for which said deletion control step has once determined that the print job could not be canceled when said deletion control step determines that the print job can be deleted based on current print job status information acquired by said acquisition step.

8. The print control method according to claim 7, further comprising:
a storage step of storing print job information including print job status issued to the printer,
wherein, in response to a print job cancellation instruction, the deletion control step determines the status of the print job for which a print job cancellation instruction has been issued based on the print job information stored in the storage step and sets the print job status to a deletion reservation status if the print job status is such that the print job cannot be deleted, and
wherein, in response to an information acquisition instruction by said acquisition step, the deletion control step determines whether or not the print job of which the status is set to the deletion reservation status can be deleted, and if so, deletes the print job.

9. The print control method according to claim 7, wherein the print job status information from a printer indicating whether or not an input print job can be deleted is acquired through a job generation event issued by the printer that indicates that the input print job is registered in a job queue.

10. The print control method according to claim 7, wherein the print job status information from a printer indicating whether or not an input print job can be deleted is acquired through a response to a command issues to the printer to acquire a list of print jobs registered in a job queue.

11. A computer program residing on a computer-readable medium, comprising:
an acquisition module causing a computer to acquire print job status information indicating that a print job can be deleted from a printer; and
a deletion module causing a computer to determine whether or not the print job designated for cancellation can be deleted based on the print job status information and to cancel the print job designated for cancellation when the print job can be deleted based on the print job status information acquired by said acquisition module,
wherein said deletion module cancels the print job for which said deletion module has once determined that the print job could not be canceled when said deletion module determines that the print job can be deleted based on current print job status information acquired by said acquisition module.

12. The computer program residing on a computer-readable medium according to claim 11, wherein the acquisition module acquires the print job status information indicating that a print job can be deleted through a job generation event issued by the printer that indicates that the input print job is registered in a job queue.

13. The computer program residing on a computer-readable medium according to claim 11, wherein the acquisition module acquires a notification.

14. The computer program residing on a computer-readable medium according to claim 11, wherein the acquisition module acquires the print job status information from a printer indicating whether or not an input print job can be deleted through a response to a command issues to the printer to acquire a list of print jobs registered in a job queue.

15. A computer readable recording medium for storing a computer program, the program comprising:
an acquisition module causing a computer to acquire print job status information indicating that a print job can be deleted from a printer; and
a deletion module causing a computer to determine whether or not the print job designated for cancellation can be deleted based on the print job status information and to cancel the print job designated for cancellation when the print job can be deleted based on the print job status information acquired by said acquisition module,
wherein said deletion module cancels the print job for which said deletion module has once determined that the print job could not be canceled when said deletion module determines that the print job can be deleted based on current print job status information acquired by said acquisition module.

16. The print control apparatus according to claim 1, further comprising a setting unit adapted to set the print job for which a print job cancellation instruction has been issued to be cancelled if said deletion control unit has determined that the print job could not be deleted,
wherein said deletion control unit cancels the print job for which said deletion control unit has once determined that the print job could not be canceled when said deletion control unit determines that the print job can be deleted based on current print job status information acquired by said acquisition unit.

17. The print control method according to claim 7, further comprising a setting step of setting the print job for which a print job cancellation instruction has been issued to be cancelled if said deletion control step has determined that the print job could not be deleted.

18. The computer program according to claim 11, further comprising a setting module for setting the print job for which a print job cancellation instruction has been issued to be cancelled if said deletion control module has determined that the print job could not be deleted.

19. The computer program residing on a computer-readable medium according to claim 11, further comprising:
a storage module causing a computer to store print job information including print job status issued to the printer,
wherein, in response to a print job cancellation instruction, the deletion module determines the status of the print job for which a print job cancellation instruction has been issued based on the print job information stored by the storage module and sets the print job status to later delete if the print job status is such that the print job cannot be deleted at once, and
wherein, having acquired notification from the printer by said acquisition module, the deletion module determines whether or not the deletable print job is the print job to be deleted later, and if so, deletes the print job.

* * * * *

UNITED STATES PATENT AND TRADEMARK OFFICE
CERTIFICATE OF CORRECTION

PATENT NO.        : 7,242,488 B2
APPLICATION NO.   : 10/159032
DATED             : July 10, 2007
INVENTOR(S)       : Matsueda It is certified that error appears in the above-identified patent and that said Letters Patent is hereby corrected as shown below:

SHEET 6:
FIG. 6, "RESGITERED" should read -- REGISTERED --.

SHEET 7:
FIG. 7, S76, "REGISTRATOIN" should read -- REGISTRATION --.

COLUMN 2:
Line 38, "issues" should read -- issued --.

COLUMN 5:
Line 62, "out)" should read -- Out) --; and
Line 66, "by job" should read -- by a job --.

COLUMN 9:
Line 3, "system;" should read -- system. --;
Line 36, "deleted" should read -- deletes --;
Line 46, "the received" should be deleted; and
Line 47, "event notification" should be deleted.

COLUMN 10:
Line 11, "the corresponding to" should read -- corresponding --;
Line 18, "ion the" should read -- in the --; and
Line 64, "to known" should read -- to know --.

COLUMN 11:
Line 59, "indicates" should read -- indicate --; and
Line 62, "conditions" should read -- conditions --.

COLUMN 13:
Line 28, "issues" should read -- issued --.

UNITED STATES PATENT AND TRADEMARK OFFICE
CERTIFICATE OF CORRECTION

PATENT NO. : 7,242,488 B2
APPLICATION NO. : 10/159032
DATED : July 10, 2007
INVENTOR(S) : Matsueda It is certified that error appears in the above-identified patent and that said Letters Patent is hereby corrected as shown below:

COLUMN 14:
Line 1, "issues" should read -- issued --.

Signed and Sealed this

Twenty-ninth Day of April, 2008

JON W. DUDAS
*Director of the United States Patent and Trademark Office*